(12) United States Patent
Barsumian et al.

(10) Patent No.: US 7,808,226 B1
(45) Date of Patent: *Oct. 5, 2010

(54) LINE TRACING METHOD AND APPARATUS UTILIZING NON-LINEAR JUNCTION DETECTING LOCATOR PROBE

(75) Inventors: Bruce R. Barsumian, Cookeville, TN (US); Thomas H. Jones, Cookeville, TN (US); Sean M. Kelly, Cookeville, TN (US)

(73) Assignee: Research Electronics International, Algood, TN (US)

( * ) Notice: Subject to any disclaimer, the term of this patent is extended or adjusted under 35 U.S.C. 154(b) by 908 days.

This patent is subject to a terminal disclaimer.

(21) Appl. No.: 11/258,944

(22) Filed: Oct. 26, 2005

(51) Int. Cl.
G01R 19/00 (2006.01)
G01R 31/11 (2006.01)
(52) U.S. Cl. ......................... 324/67; 324/533; 324/534; 324/535
(58) Field of Classification Search .................. 324/67, 324/326, 533, 534, 535; 342/193; 340/572.2, 340/551, 572.1, 572.4, 572.7
See application file for complete search history.

(56) References Cited

U.S. PATENT DOCUMENTS

| | | | | |
|---|---|---|---|---|
| 3,299,351 A | * | 1/1967 | Williams | ..................... 324/521 |
| 3,631,484 A | | 12/1971 | Augenblick | |
| 3,733,545 A | * | 5/1973 | Elsner et al. | ................. 324/520 |
| 4,053,891 A | | 10/1977 | Opitz | |
| 4,063,229 A | | 12/1977 | Welsh et al. | |
| 4,123,749 A | | 10/1978 | Hartmann et al. | |
| 4,331,957 A | | 5/1982 | Enander et al. | |
| 4,413,254 A | | 11/1983 | Pinneo et al. | |
| 4,439,769 A | | 3/1984 | Masak | |
| 4,471,344 A | | 9/1984 | Williams | |
| 4,547,724 A | | 10/1985 | Beazley et al. | ................. 325/57 |
| 4,586,048 A | | 4/1986 | Downie | |
| 4,595,915 A | | 6/1986 | Close | |
| 4,700,179 A | | 10/1987 | Fancher | |
| 5,191,343 A | | 3/1993 | Danzer et al. | |
| 5,414,410 A | | 5/1995 | Davies et al. | |
| 5,557,283 A | | 9/1996 | Sheen et al. | |
| 5,881,132 A | | 3/1999 | O'Brien et al. | ................ 379/35 |
| 5,990,791 A | | 11/1999 | Endreasen et al. | |
| 5,994,905 A | | 11/1999 | Franchville | ................. 324/534 |

(Continued)

*Primary Examiner*—Reena Aurora
(74) *Attorney, Agent, or Firm*—Hornkohl Intellectual Property Law PLLC; Jason L. Hornkohl

(57) ABSTRACT

A method, device, and apparatus for tracing a conductive line and locating any concealed surveillance devices coupled to the line uses a signal generator to produce a test signal having a fundamental frequency which is coupled to the line under test. The test signal flowing through the line under test creates electromagnetic waves that propagate through the atmosphere away from the line. A portable locator probe is used to detect the radiated signal and thus the conductive line by detecting the magnitude of the radiated signal. As the locator probe is moved closer to the line, the amplitude of the detected signal increases. In addition, the portable locator probe detects harmonic signals radiated from nonlinear junctions coupled to the line at harmonic frequencies of the fundamental test signal. By examining the relative strengths of the second and third harmonic signals, a user can determine if the detected non-linear junction is being produced by a semiconductor or a corrosive/dissimilar metal type non-linear junction. A DC bias voltage can be used to improve the responses of any semiconductor based non-linear junctions. Any semiconductor junctions located with the probe are manually examined to determine the cause of the non-linear junction.

26 Claims, 3 Drawing Sheets

U.S. PATENT DOCUMENTS

| | | | |
|---|---|---|---|
| 6,057,765 A | 5/2000 | Jones et al. | 340/572.2 |
| 6,097,798 A | 8/2000 | Albers et al. | 379/114.3 |
| 6,163,259 A | 12/2000 | Barsumian et al. | 340/572.2 |
| 6,177,801 B1 | 1/2001 | Chong | 324/520 |
| 6,765,527 B2 | 7/2004 | Jablonski et al. | 342/193 |
| 6,897,777 B2 | 5/2005 | Holmes et al. | 340/572.2 |
| 6,934,655 B2 | 8/2005 | Jones et al. | 702/108 |
| 2004/0036478 A1 | 2/2004 | Logvinov et al. | |

* cited by examiner

LINE TRACING METHOD AND APPARATUS UTILIZING NON-LINEAR JUNCTION DETECTING LOCATOR PROBE

FIELD OF THE INVENTION

The present invention relates generally to the field of concealed surveillance device detection. More particularly, the present invention relates to the use of non-linear junction detection methods and apparatus to locate and trace existing transmission lines and identify any non-linear junctions coupled to the lines that might represent covert surveillance devices.

CROSS-REFERENCES TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

There are many applications where it is desirable and/or necessary to trace or locate the position of a concealed conductive element, such as an underground cable or pipe. Prior art techniques have been proposed in the past for coupling an electrical signal to the conductive element at a frequency so as to produce remotely detectable radiation. A portable receiver, which is tuned to the particular electrical signal's frequency, is then passed over the area and conventional signal detection techniques are used to pinpoint the location and path of the conductive element. Unfortunately, these prior art techniques are not capable of locating or identifying any covert surveillance devices that may be coupled to the line under test. Also, these prior art techniques are not capable of locating or identifying other types of non-linear junctions such as produced by corrosive metals, or dissimilar metals that may be of interest for specific applications. Therefore, what is needed is an improved line tracing method and apparatus that locates and identifies non-linear junctions coupled to a transmission line.

Non-linear junction detectors, such as described in U.S. Pat. Nos. 6,057,765 and 6,163,259 which are assigned to the assignee of the present invention and hereby incorporated in the present application by reference, for detecting the presence of concealed electronic devices are known in the prior art. However, these detectors are not capable of locating and tracing conductive transmission lines concealed within the walls of a structure. Thus, prior art non-linear junction detectors must be methodically scanned over an entire area to locate any concealed surveillance devices. Furthermore, these detectors are incapable of determining whether a located semiconductor device is coupled to a transmission line or not. Therefore, what is needed is a non-linear junction detector that can trace transmission lines and identify any electronics coupled to the line being traced.

BRIEF SUMMARY OF THE INVENTION

An embodiment of the present invention is directed toward a method of tracing a conductive line and identifying non-linear junctions on the line. In accordance with the method, a detection signal having a first fundamental frequency is generated and coupled to the conductive line. In an alternative embodiment, a first detection signal having a first fundamental frequency is generated and a second detection signal having a second fundamental frequency equal to approximately one half of the first detection signal is generated such that a second harmonic frequency of the second detection signal is approximately equal to the first fundamental frequency of the first detection signal. This embodiment may also have a third detection signal having a third fundamental frequency equal to approximately one third of the first detection signal such that a third harmonic frequency of the third detection signal is approximately equal to the first fundamental frequency of the first detection signal. This embodiment provides the benefit of having a single frequency receiver. In an embodiment utilizing a detection signal that is some whole number factor of the first fundamental frequency for the purpose of testing for harmonics using a single frequency receiver, these lower frequency detection signals are referred to as "sub-harmonic" test signals. The conductive line is traced by remotely detecting a signal strength of the detection signal radiating from the conductive line. A portable locator probe is preferably used to detect the conductive line. Non-linear junctions on the conductive line are located by remotely detecting signals radiated from the non-linear junctions. The signals radiated from the non-linear junctions are at harmonic frequencies of the detection signal. A signal strength at a second and third harmonic frequency of the fundamental frequency is remotely detected and the signal strength of the signal at the second harmonic frequency is compared to the signal strength at the third harmonic frequency to determine if the non-linear junction is a semi-conductor based non-linear junction or a corrosive/dissimilar metal type non-linear junction. A detected signal strength of the detection signal at the first fundamental frequency and a detected signal strength of at least one harmonic signal being radiated by a non-linear junction are displayed. In all of the previously discussed methods and embodiments, introducing a DC voltage bias to a dry line (a line not intentionally connected to any electronic circuitry) can enhance the response to the non-linear junction detection process. Applying a DC voltage bias to the dry line has the effect of potentially biasing or powering any potential surreptitious electronic connections, which enhances the detection process. Furthermore, taking multiple measurements at different DC bias voltages may result in differing responses from a non-linear junction further providing indication of surreptitious electronics connected on the line. These measurements may be made at different discrete DC bias voltage levels or a time varying DC voltage may be applied and measurements observed as a function of the applied DC voltage change. If there are no surreptitious electronics connected to the line, the measurements should be constant for variations in applied DC voltage. However, if surreptitious electronics are connected to the line, the measurements should vary as a function of the varying DC bias voltage due to the response by the surreptitious electronics to the applied DC bias voltage.

Another embodiment of the present invention is directed toward a device for tracing a transmission line and locating any non-linear junctions coupled to the transmission line that may be indicative of a concealed surveillance device or a corrosive/dissimilar metal type of non-linear junction. The device includes a signal generating and transmitting device for generating a first signal having a fundamental frequency and coupling the signal to the transmission line. The device may also include DC voltage bias circuitry that can be used to enhance the response to the non-linear junction detection processes by providing a DC bias voltage to the line under test. In an alternative embodiment, the signal generating and transmitting device generates a second signal having a frequency approximately equal to one half of the fundamental frequency and a third signal having a frequency approximately equal to one third of the fundamental frequency. A portable locator probe having an antenna remotely detects a signal strength of the first signal at the first fundamental frequency radiating from the transmission line and a signal strength of at least one harmonic frequency signal radiating from a non-linear junction coupled to the transmission line. In the alternative embodiment, the portable locator probe is configured to only receive signals at a predetermined receiver frequency and the signal generator varies it's transmit frequencies. Most preferably, the portable locator probe detects signal strengths of signals at second and third harmonic frequencies of the first signal. Processing logic predicts whether or not a semiconductor or a corrosive/dissimilar metal type non-linear junction has been detected based upon the detected signal strengths of the second and third harmonic frequency signals. The portable locator includes a display for displaying a relative signal strength of the first signal and at least one harmonic frequency signal.

Yet another embodiment of the present invention is directed toward an apparatus for determining a location of an at least partially concealed electrically conductive line and detecting the presence of nonlinear junctions coupled to the electrically conductive line. The apparatus includes a signal generator for generating a test signal having at least one fundamental frequency component and coupling the test signal to the electrically conductive line. The embodiment may also include DC voltage bias circuitry that can be used to enhance the response to the non-linear junction detection processes by coupling a DC bias voltage to the line under test. The locator probe detects the conductive line by detecting signals radiated from the conductive line at the fundamental frequency and detects non-linear junctions by detecting harmonic signals radiating from any non-linear junctions. The locator probe is preferably a hand held portable device. The locator probe detects the non-linear junctions by detecting at least one of a second and third harmonic of the test signal. In a preferred embodiment, the signal generator alters the frequency of the test signal such that a single frequency receiver in the locator probe can be utilized to detect both the electrically conductive line and the harmonic signals associated with any non-linear junctions present on the line. The signal generator accomplishes this by producing a second test signal having a frequency equal to one half the test signal and a third test signal having a frequency equal to approximately one third of the test signal such that the single frequency receiver tuned to the fundamental frequency can also be utilized to detect the second and third harmonics radiated by non-linear junctions. An especially preferred embodiment of the apparatus includes a near-field, directional antenna that is utilized in the locator probe such that when the near-field antenna is passed directly over the conducting line or the reradiating non-linear junction, a null is created in the signal strength because the antenna structure is tangential to the radiating electromagnetic field and no energy is absorbed by the antenna at this point. This effect results in an apparent null in the detection process and two peaks in detected signal on either side of the desired detection point. Although it is detected as a null, it is understood by those schooled in the art that this null effect is in fact the peak of the of the detected signal and that this null effect is quite useful in localizing the exact position of either the conductor or the radiating non-linear junction. An output interface displays a detected amplitude of the test signal and at least one of the second and third harmonic signals. An audible output may also be used to indicate an amplitude of the detected radiated signals.

DETAILED DESCRIPTION OF THE INVENTION

Figure 1:
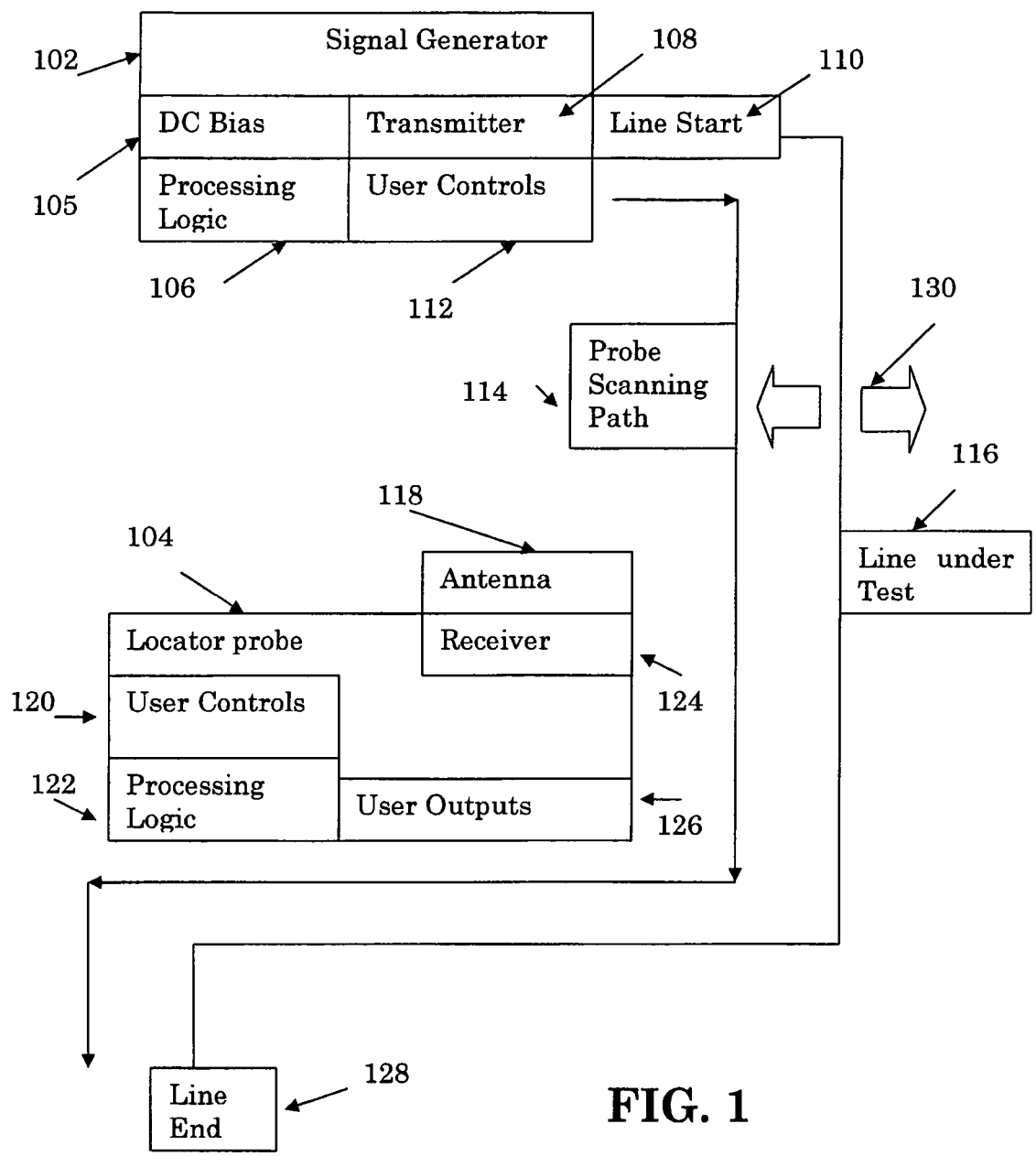
FIG. 1 is a block diagram of an apparatus for tracing a conductive wire and locating any non-linear junctions coupled to the wire.

Referring now to FIG. 1, a block diagram illustrating the basic elements and functions of an embodiment of the present invention is shown. The main components of the embodiment shown in FIG. 1 are a signal generator 102 and a locator probe 104. The signal generator 102 is used to generate a test signal and couple the generated test signal to the line under test 166. The signal generator 102 includes a transmitter 108, processing logic 106 and a set of user controls 112. The signal generator 102 may also contain DC bias circuitry 105 that generates a DC bias voltage that is coupled to the line under test. In a preferred embodiment, the user controls 112 allow a user to control the signal parameters of the signals produced by the signal generator. The locator probe 104 is used to detect the presence and amplitude of the electromagnetic radiation 130 produced by the signal propagating down the line under test 116. The locator probe 104 includes an antenna 118, receiver 124, processing logic 122, user controls 120 and a set of user outputs 126. The antenna 118 may be an antenna that produces a null when positioned directly over the line being located as discussed in more detail below.

To trace a line and detect the presence of any covert surveillance devices using the signal generator 102 and locator probe 104, the transmitter 108 of the signal generator 102 is coupled to a point on the line under test 116, most preferably at the start 110 of the line 116. The signal generator 102 is then activated to transmit a signal having a known frequency down the line 116. This signal is most preferably a single frequency tone. As is well known to those skilled in the art, a current flowing through a conductor produces an electromagnetic field 130 in the proximity of the conductor 116. The locator probe 104, which is preferably cordless and powered with a rechargeable battery, can receive this electromagnetic radiation 130 through its antenna 118 and receiver 124. The antenna 118 is most preferably a wire-wound ferrite antenna. As the locator probe 104 is moved nearer and farther away from the radiating line 116, the strength of the detected radiation will rise and fall. Thus, by swiping the locator probe 104 back and forth and looking for the peak in the detected signal amplitude, the location of the line under test 116, which is often concealed in a wall or buried underground, can be detected. If a near field antenna such as a wire wound ferrite rod is used, the location of the line under test 116 will correspond to a detected null having peaks on either side. In addition, any wire electrically connected to the line under test 116 will also be radiating and detectable. Therefore, the locator probe can also be used to locate any electrical connections to the transmission line.

Non-linear junctions are present in dissimilar or corrosive metal junctions. In addition, non-linear junctions are present in semiconductor electronic components. When subjected to an electrical signal or electromagnetic radiation at a given frequency, a non-linear junction will re-radiate harmonic signals at whole integer multiples of the frequency of the original electrical signal that was applied to the non-linear junction. For example, if a nonlinear junction is radiated with a signal having a frequency of 100 kHz, the non-linear junction will re-radiate signals having frequencies of 200 kHZ, 300 kHz, 400 kHz, etc. The 200 kHz frequency is known as, and referred to herein as, the second harmonic, and the 300 kHz frequency is known as the third harmonic.

Interestingly, non-linear junctions such as produced by corrosive or dissimilar metal junctions tend to re-radiate much higher amplitude third harmonic signals than second harmonic signals. However, semiconductor based non-linear junctions, such as found in all types of modern electronics, tend to radiate much stronger second harmonics than third harmonics. In addition, semiconductor based non-linear junctions have a response that varies depending upon the level of DC bias on the line. Thus, the amplitudes of the harmonic signals re-radiated by a non-linear junction provide an indication of the type of non-linear junction re-radiating the harmonics.

Referring back to FIG. 1, the signal generator 102 produces a signal having a known frequency. As the signal propagates down the line under test 116, it may encounter a non-linear junction. These non-linear junctions might be caused by completely innocuous dissimilar or corrosive metal non-linear junctions such as result from staples piercing the line under test 116 or rust or more nefarious sources such as the semiconductors present in a covert surveillance device. When the non-linear junction is subjected to the transmitted signal, it begins to re-radiate harmonic frequencies, or whole integer multiples, of the original signal frequency. As the locator probe 104 is moved along the line under test 116, it detects and outputs a relative amplitude indication of the fundamental signal and harmonic frequencies of the transmitted signal detected by the antenna 118 and receiver 124. The relative strength of the detected signals at the fundamental frequency and the harmonic frequencies are preferably communicated to the user through a set of user outputs 126. In various embodiments, the outputs could be bar graph displays, LED's, audible signals, etc. As the user tracing the line under test 116 nears the non-linear junction, the locator probe 104 will detect a rise in the amplitude of the re-radiated harmonics, which will then drop off as the locator probe 104 is moved farther away from the non-linear junction. As previously described, if a near field antenna is utilized, a null effect may occur at the peak of the detected signal resulting in a detected null surrounded by peaks. The location at which the detected strength of the harmonics is strongest corresponds to the approximate location of the non-linear junction. Thus, the present invention can be used to locate the presence of non-linear junctions on transmission lines that are concealed or inaccessible. More importantly, by examining the relative amplitudes of the second and third harmonics on the harmonic outputs 126 of the locator probe 104 as described in more detail herein, a user of the locator probe 104 can determine whether the non-linear junction is part of a semiconductor device and, thus, a potential covert surveillance device, or a benign corrosive metal junction without the need to visually inspect the relevant portion of the line under test 116. This is particularly beneficial when the line under test 116 is concealed within a structure such as wall that makes a manual inspection costly and difficult. Thus, it is only necessary to manually inspect the line under test 116 to determine if the detected non-linear junction does in fact represent a covert surveillance device when a suspicious semiconductor based non-linear junction is located.

A DC bias voltage may be added to the line under test to improve the ability to discriminate between semiconductor and corrosive metal based non-linear junctions. Semiconductor based non-linear junctions have a heightened response when a DC bias voltage is applied to the junction. In addition, the response of a semiconductor based non-linear junction varies depending upon the amount of DC bias voltage applied to the line. Thus, by applying a DC bias voltage to a line being tested or by varying the DC bias voltage, the ability to locate and identify semiconductor based non-linear junctions can be increased.

Figure 2:
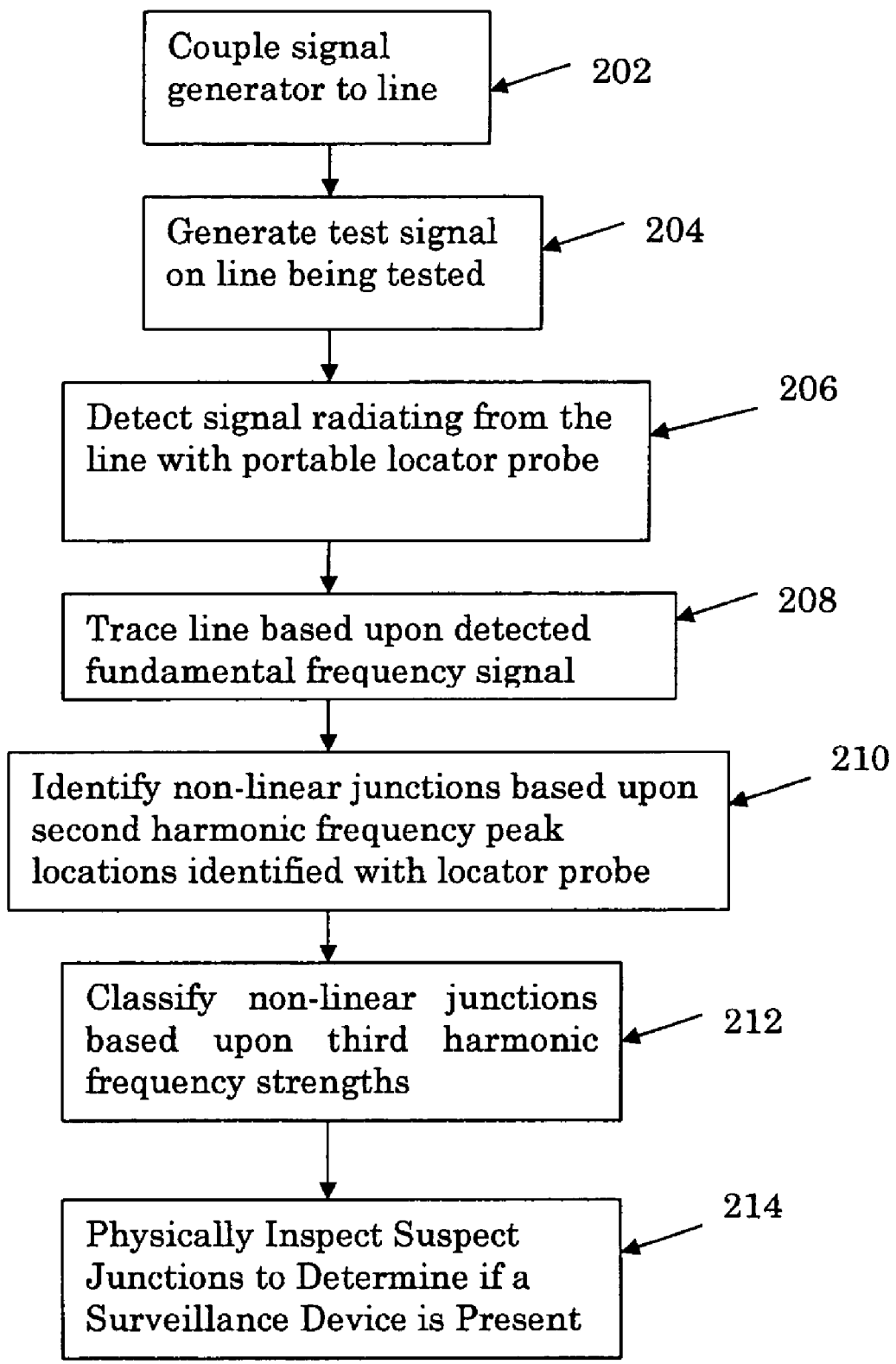
FIG. 2 is a flow chart of a method for tracing a conductive wire and locating any non-linear junctions coupled to the wire.

Referring now to FIG. 2, a flow chart of a preferred method for tracing a line and locating any non-linear junctions along the line is shown. The method starts in step 202 with the coupling of the signal generator to the line. The method then proceeds to step 204 wherein a signal having a fundamental frequency component is generated on the line under test. A preferred transmit signal is a single frequency sinusoidal waveform having a frequency of 450 kHz with a combined DC bias voltage. Next, in step 206, the user attempts to detect electromagnetic waves being radiated from the line under test in response to the transmitted signal. The line is then traced based upon the detection of the radiated signal in step 208. This allows the user to locate and map a transmission or power line that is concealed in a wall. Non-linear junctions are identified as the line is traced by locating points along the line where peaks in the amplitude of the second and third harmonics of the transmitted signal are detected in step 210. In step 212, the detected nonlinear junctions are classified based upon the relative detected strengths of the second and third harmonics as discussed in more detail herein. As discussed above, the non-linear junctions may also be classified by varying the applied DC bias voltage. Classifying the non-linear junctions as either semiconductor based or non-semiconductor based allows a user looking for concealed surveillance devices to limit their search to those junctions that are most likely to represent such devices. Finally, in step 214, any non-linear junctions that appear to be caused by a semiconductor device are physically inspected to determine if a surveillance device is actually present.

Figure 3A:
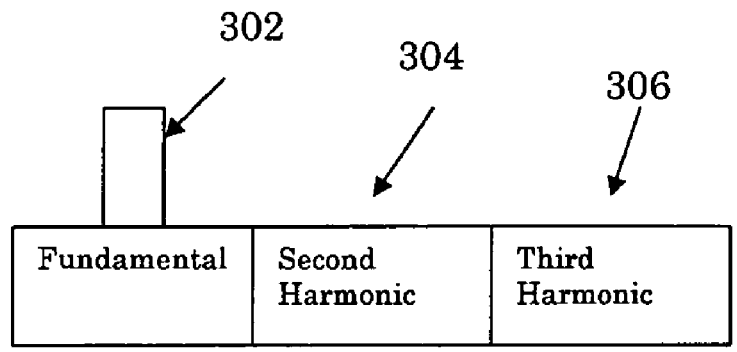
FIG. 3 is graph of representative harmonic strengths associated with semiconductor and non-semiconductor non-linear junctions.

As discussed above, the relative strengths of the second and third harmonics of the fundamental frequency signal can be used to determine if a non-linear junction is semiconductor or non-semiconductor based. Referring now to FIGS. 3(a-c), a preferred set of outputs for the non-linear junction locator probe is shown. The outputs preferably include a fundamental signal amplitude 302, a second harmonic signal amplitude 304 and a third harmonic signal amplitude 306. In FIG. 3(a), a relatively weak fundamental signal 302 and no second harmonic 304 or third harmonic signal 306 is being detected. This corresponds to the situation where the locator probe is near the conductive line being traced, but not near any non-linear junctions coupled to the conductive line. As discussed above, the conductive line can be located by simply waving the locator probe over an area and determining the point where the detected strength of the fundamental signal 302 is strongest which may be indicated with a null effect when a near field antenna is used as previously described. As this procedure is repeated, the path of the conductive transmission line will become apparent.

Figure 3B:
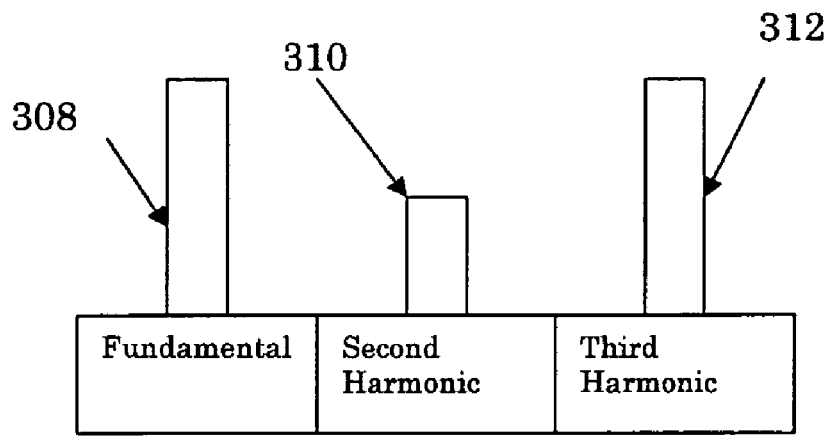

In FIG. 3(b), the amplitude of the fundamental frequency signal 308 has increased with respect to FIG. 3(a). This indicates that the locator probe has been moved closer to the line being traced than it was when the reading of FIG. 3(a) was obtained. In addition, the second 310 and third harmonic signal 312 strengths detected by the locator probe have increased dramatically. This indicates that a non-linear junction is coupled to the transmission line near the location where the readings of FIG. 3(b) were obtained. In addition, the relative strength of the third harmonic 312 with respect to the second harmonic 310 indicates that the non-linear junction is most likely a dissimilar or corrosive metal junction that is not likely to be indicative of a covert surveillance device.

Figure 3C:
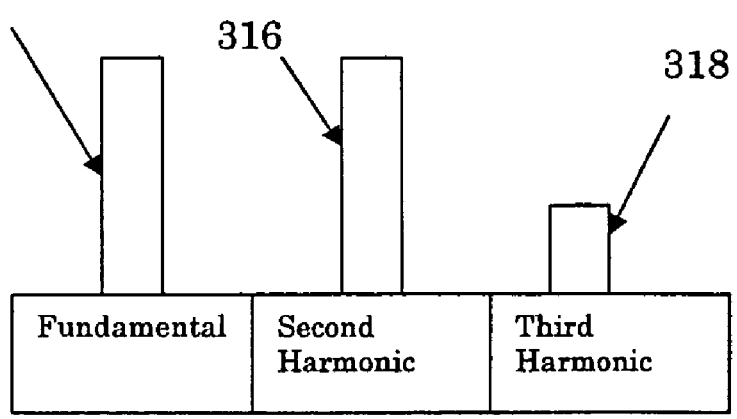

In FIG. 3(c), the fundamental frequency signal strength 314 is high indicating that the conductive line on which the generated signal is propagating is near by. In addition, the second harmonic signal's amplitude 316 is relatively high and the third harmonic signal's amplitude 318 is relatively low. This indicates that a non-linear junction is coupled to the line under test in the vicinity of the locator probe. Furthermore, since the second harmonic frequency signal 316 strength is much higher than the third harmonic frequency signal 318 strength, the detected non-linear junction is most likely the result of a semiconductor such as might be found in a covert surveillance device. The location of such a detected semiconductor non-linear junction should be manually examined to determine if it is in fact part of a covert surveillance device.

While the above description of the present invention focused on its applicability to detecting concealed surveillance devices, the present invention can be advantageously used in a number of diverse fields. For example, the invention's ability to detect corrosive metal junctions can be used to inspect metal pipes or construction materials for defects or decay. In addition, if proper safety precautions are taken, the present invention could possibly be used to detect concealed explosive devices that may be attached to miscellaneous wiring.

Although there have been described particular embodiments of the present invention of a new and useful line tracing method and apparatus utilizing a non-linear junction detecting locator probe, it is not intended that such references be construed as limitations upon the scope of this invention except as set forth in the following claims.

Thus, although there have been described particular embodiments of the present invention of a new and useful LINE TRACING METHOD AND APPARATUS UTILIZING NON-LINEAR JUNCTION DETECTING LOCATOR PROBE, it is not intended that such references be construed as limitations upon the scope of this invention except as set forth in the following claims.

What is claimed is:

1. A method of tracing a conductive line and identifying electronic devices electrically connected to said line, said method comprising:
   generating a detection signal having a first fundamental frequency;
   coupling said detection signal to said conductive line;
   tracking said conductive line by remotely tracing the signal strength of said detection signal radiating from said conductive line; and
   locating said electronic devices electronically connected to said conductive line by remotely detecting harmonic signals produced by said electronic devices at a second harmonic frequency of said detection signal in response to said electronic devices being exposed to said detection signal.

2. The method of claim 1 wherein the step of locating said electronic devices further comprises remotely detecting a signal strength at a second and third harmonic frequency of said fundamental frequency and comparing a signal strength of said signal at said second harmonic frequency to a signal strength at said third harmonic frequency to identify a corrosive/dissimilar metal type non-linear junction.

3. The method of claim 1 wherein generating a detection signal comprises generating a first detection signal having a first fundamental frequency and generating a second detection signal having a second fundamental frequency equal to approximately one half of said first detection signal such that a second harmonic frequency of said second detection signal is approximately equal to said first fundamental frequency of said first detection signal.

4. The method of claim 1 wherein a DC bias voltage circuit is added to a conductive line for the purpose of enhancing a harmonic non-linear junction response to the detection signal.

5. The method of claim 4 wherein the DC bias voltage is varied in value to and/or polarity for the purpose of enhancing the harmonic non-linear junction response to the detection signal and improving the ability to discriminate between semiconductor based non-linear junctions and corrosive/dissimilar metal type non-linear junctions.

6. The method of claim 1 further comprising displaying a detected relative signal strength of said detection signal at said first fundamental frequency and displaying a relative detected signal strength of at least one harmonic signal being radiated by a non-linear junction.

7. The method of claim 1 wherein said detection signals are coupled to the line at a first fundamental frequency and then at least one second sub-harmonic frequency.

8. The method of claim 1 wherein the step of locating the conductive line further comprises using a portable locator probe to detect said conductive line by detecting a signal strength of said detection signal radiating from said conductive line.

9. The method of claim 1 further comprising using a near field antenna such that the antenna has a null affect when the antenna field is orthogonal to the detecting signal to track said conductive line and locate said non-linear junctions.

10. A device for tracing a transmission line and locating any non-linear junctions coupled to said transmission line that may be indicative of a concealed surveillance device, said device comprising:
   a signal generating and transmitting device for generating a first signal having a fundamental frequency and coupling said signal to said transmission line wherein said signal generator includes DC bias voltage circuitry for generating a DC bias voltage which is connected to the conducting line to enhance the response of said non-linear junctions coupled to said transmission line; and
   a portable locator probe having an antenna for remotely detecting a relative strength of said first signal at said first fundamental frequency radiating from said transmission line and detecting a relative signal strength of at least one harmonic frequency signal radiating from a non-linear junction coupled to said transmission line.

11. The device of claim 10 wherein said portable locator probe detects relative signal strengths of signals at second and third harmonic frequencies of said first signal.

12. The device of claim 11 further comprising processing logic for predicting whether or not a semiconductor non-linear junction has been detected based upon said detected signal strengths of said second and third harmonic frequency signals.

13. The device of claim 10 wherein said signal generating and transmitting device further generates a second signal having a frequency approximately equal to one half of said fundamental frequency and a third signal having a frequency approximately equal to one third of said fundamental frequency.

14. The device of claim 10 wherein the DC bias voltage is changed in value or in polarity.

15. The device of claim 10 wherein said portable locator includes a display for displaying signal strength information of said first signal and said at least one harmonic frequency signal.

16. The device of claim 10 wherein said antenna is a near field antenna designed to create a null affect over the peak of the detected line.

17. An apparatus for determining a location of an at least partially concealed conductive line and detecting the presence of non-linear junctions coupled to said electrically conductive line, said apparatus comprising:
  a signal generator for generating a test signal having at least one fundamental frequency component and coupling said test signal to said electrically conductive line; and
  a locator probe for detecting, said conductive line by detecting signals radiated from said conductive line at said fundamental frequency and detecting, said non-linear junctions by detecting signals radiating from said non-linear junctions;
  wherein said signal generator alters the frequency of said test signal such that a single frequency receiver in said locator probe can be utilized to detect both said electrically conductive line and said non-linear junction harmonic signals.

18. The apparatus of claim 17 wherein DC bias voltage circuitry is connected to the conducting line to enhance a response of the non-linear junctions to the test signal.

19. The apparatus of claim 17 wherein said signal generator produces sub harmonic detection signals of a first fundamental signal such that said single frequency receiver tuned to said fundamental frequency can also be utilized to detect second and third harmonics radiated by non-linear junctions.

20. The apparatus of claim 17 wherein said locator probe detects said non-linear junctions by detecting at least one of a second and third harmonic of said test signal.

21. The apparatus of claim 17 wherein said locator probe further comprises a display for displaying detection information concerning said test signal and at least one of said second and third harmonic signals.

22. The apparatus of claim 17 further comprising a near field antenna designed to create a null over the detected line.

23. A method of tracing a concealed conductive line and identifying electronic devices coupled to said line, said method comprising:
  generating a detection signal having a first fundamental frequency;
  coupling said detection signal to said concealed conductive line;
  tracking said concealed conductive line by remotely tracing the signal strength of said detection signal radiating from said conductive line; and
  locating electronic devices coupled to said conductive line by remotely detecting harmonic signals radiated front said electronic devices at harmonic frequencies of said detection signal in response to said detection signal.

24. The method of claim 23 wherein said concealed conductive line is a digital communication line.

25. The method of claim 24 further comprising the step of electrically coupling a DC bias voltage to said digital communication line.

26. The method of claim 23 further comprising the step of comparing a signal strength of a second and a third harmonic signal to distinguish said electronic devices from metallic junctions.

\* \* \* \* \*